United States Patent
Esbensen et al.

(10) Patent No.: US 11,952,984 B2
(45) Date of Patent: Apr. 9, 2024

(54) METHOD AND DEVICE FOR CONTROLLING A WIND TURBINE TO REDUCE NOISE

(71) Applicant: Siemens Gamesa Renewable Energy A/S, Brande (DK)

(72) Inventors: Thomas Esbensen, Herning (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/907,911

(22) PCT Filed: Mar. 1, 2021

(86) PCT No.: PCT/EP2021/055070
§ 371 (c)(1),
(2) Date: Aug. 29, 2022

(87) PCT Pub. No.: WO2021/175792
PCT Pub. Date: Sep. 10, 2021

(65) Prior Publication Data
US 2023/0142969 A1    May 11, 2023

(30) Foreign Application Priority Data
Mar. 5, 2020 (EP) .................................... 20161223

(51) Int. Cl.
*F03D 7/02* (2006.01)
(52) U.S. Cl.
CPC ......... *F03D 7/0296* (2013.01); *F03D 7/0232* (2013.01); *F05B 2240/3052* (2020.08); *F05B 2260/96* (2013.01); *F05B 2270/333* (2013.01)

(58) Field of Classification Search
CPC ................ F03D 7/0296; F03D 7/0232; F05B 2240/3052; F05B 2260/96
See application file for complete search history.

(56) References Cited

U.S. PATENT DOCUMENTS

| | | | |
|---|---|---|---|
| 8,167,554 B2 * | 5/2012 | Wang | F03D 1/0675 416/23 |
| 8,829,706 B1 * | 9/2014 | Sammy | F03D 1/025 290/55 |
| 9,777,703 B2 * | 10/2017 | Madsen | F03D 7/0244 |

(Continued)

FOREIGN PATENT DOCUMENTS

EP    1736664 A1    12/2006

OTHER PUBLICATIONS

PCT International Search Report and Written Opinion of International Searching Authority dated Jun. 4, 2021 corresponding to PCT International Application No. PCT/EP2021/055070 filed Mar. 1, 2021.

*Primary Examiner* — Long T Tran
(74) *Attorney, Agent, or Firm* — Schmeiser, Olsen & Watts LLP

(57) ABSTRACT

A method of controlling a wind turbine, wherein the wind turbine includes a hub having at least one blade with at least one an add-on member which is actuated to alter aerodynamic properties of the blade. The method includes a step of acquiring a target noise level, and a step of controlling the at least one add-on member of the blade such that an actual noise level caused by the operation of the wind turbine is equal to or below the target noise level.

14 Claims, 4 Drawing Sheets

(56) References Cited

U.S. PATENT DOCUMENTS

| | | | |
|---|---|---|---|
| 2011/0110777 A1 | 5/2011 | Abdallah et al. | |
| 2014/0248148 A1* | 9/2014 | Abdallah | F03D 7/0296 |
| | | | 416/1 |
| 2015/0132130 A1* | 5/2015 | Brown | F03D 7/022 |
| | | | 416/43 |
| 2016/0076517 A1* | 3/2016 | Butterworth | F03D 17/00 |
| | | | 700/275 |
| 2019/0032641 A1* | 1/2019 | Stoltenjohannes | F03D 7/0224 |
| 2021/0047995 A1* | 2/2021 | Maris | G01P 5/165 |
| 2021/0355912 A1* | 11/2021 | Messing | F03D 7/0224 |

* cited by examiner

METHOD AND DEVICE FOR CONTROLLING A WIND TURBINE TO REDUCE NOISE

CROSS-REFERENCE TO RELATED APPLICATIONS

This application claims priority to PCT Application No. PCT/EP2021/055070, having a filing date of Mar. 1, 2021, which claims priority to EP Application No. 20161223.1, having a filing date of Mar. 5, 2020, the entire contents both of which are hereby incorporated by reference.

FIELD OF TECHNOLOGY

The following relates to a method of controlling a wind turbine and to a control device for controlling a wind turbine in order to reduce an actual acoustic noise level caused by the operation of the wind turbine.

BACKGROUND

Wind turbines are often built on sites that require a maximum allowed acoustic noise level. The allowed noise level may change according to the time of day, the day of the week, the wind speed, the wind direction, etc. Add-on members or flaps as aerodynamic devices such as so-called trim stall devices may increase the noise level when they are utilized. Such add-on members can be arranged in an array of many segments per wind turbine blade, each of which can stall a part of the blade. This particularly applies to trim stall devices as stalled segments of the blade typically generate more noise than non-stalled segments. If no control is imposed on the utilization of the add-on members, the resulting noise level may then exceed the allowed acoustic noise level specially during periods where stricter noise requirements are required.

Current solutions for noise curtailing turbines include steps of reducing a nominal rotor speed and/or an output power of the wind turbine. Also other parts of the wind turbines operation could be modified to reduce noise such as a pitch angle of a blade, a tip speed of the blade, etc. However, all these conventional measures reduce the performance, in particular the output power, for the wind turbines.

SUMMARY

There may be a need for a method of controlling a wind turbine and a control device for controlling a wind turbine, which can reduce the noise without unduly curtailing the wind turbine performance.

According to a first aspect of embodiments of the invention, a method of controlling a wind turbine is provided. The wind turbine comprises a hub having at least one blade with at least one an add-on member which is actuated to alter aerodynamic properties of the blade. The method comprises a step of acquiring a target noise level, for example in the environment of the wind turbine, and a step of controlling the at least one add-on member of the blade such that an actual noise level caused by the operation of the wind turbine is equal to or below the target noise level. The utilization of the add-on member is limited based on the present noise requirements. Compared with conventional noise reduction measures, an optimal operation of the wind turbine in terms of power production can be achieved because it is not necessary to reduce the nominal rotor speed or the output power. Also the pitch angle or the tip speed do not need to be changed.

In an embodiment, the at least one add-on member is controlled such that a power generation of the wind turbine is maximum, while the actual noise level caused by the operation of the wind turbine is maintained equal to or below the target noise level. It is the aim to limit the utilization of the add-on member to reach the target noise level and at the same time not to limit the utilization of the add-on member more than necessary in order to optimize the output power of the wind turbine. Generally, the utilization of the add-on members may be beneficial for power optimization or load reduction.

In an embodiment, the wind turbine, in particular the blade, comprises a plurality of the add-on members, and the plurality of add-on members is controlled by limiting a maximum number of add-on members of the plurality of add-on members, which are allowed to be simultaneously actuated to their active positions. In the context of embodiments of the present invention, the terms "active position" or "activation level" can either refer to a maximum extended position or to a position between the maximum extended position and a fully retracted position. The term "inactive position" can in turn refer to the fully retracted position.

In an embodiment, the at least one add-on member is configured to be continuously moved between a fully retracted position and a fully extended position, and the at least one add-on member is controlled by limiting a maximum allowable position, that is the active position or an activation level, between the fully retracted position and the fully extended position. While many conventional add-on members have only two operating positions, that is a closed position with insignificant effect on the airflow over the blade profile, and an open position with significant effect on the air flow, embodiments of the present invention are also applicable to add-on members such as trailing flaps, where the active position or the activation level may be continuous, e.g. with a deflection between a maximum activation or deflection level and a minimum activation or deflection level. In this case, a limitation may mean that only a limited activation range or deflection is allowed.

In an embodiment, the method further comprises a step of creating a noise model of the wind turbine or a lookup table, which describe the actual noise level as a function of an activation level of the at least one add-on member and of at least one operating parameter of the wind turbine, and the controlling of the at least one add-on member of the blade is carried out by use of the noise model or the lookup table. Thereby, a maximum power production of the wind turbine can be calculated based on the current operating conditions and noise requirements. In an embodiment, the at least one operating parameter of the wind turbine comprises at least one of a rotational speed of the hub, a power production of the wind turbine, a pitch angle of the at least one blade, and a wind speed in an environment of the wind turbine. Also other estimated parameters could be used as an input for the noise model or lookup table.

In an embodiment, the noise model or the lookup table describe the actual noise level further as a function of a position of the at least one add-on member at the blade.

For example, in an embodiment, the at least one blade comprises at least one first add-on member and at least one second add-on member, wherein the at least one first add-on member is closer to an inboard portion of the blade than the at least one second add-on member. In the context of embodiments of the present invention, the term "inboard"

can refer to a position which is closer to the hub-side of the blade, whereas the term "outboard" can refer to a position which is closer to the blade's tip-side. The first add-on member is controlled in a different manner compared with the second add-on member, in particular the first add-on member is controlled to achieve a first noise reduction level, and the second add-on member is controlled to achieve a second noise reduction level. The noise reduction level can refer to an amount by which the noise is reduced. As the outboard second add-on member usually generates more noise than the inboard first add-on member, the first noise reduction level can be lower than the second noise reduction level. Here, the limitation of the add-on member utilization is made based on the location of the add-on members.

In an embodiment, the actual noise level is measured by a noise detecting device.

According to a second aspect of embodiments of the invention, a control device for controlling a wind turbine is provided. The wind turbine comprises a hub having at least one blade with at least one an add-on member which is actuated to alter aerodynamic properties of the blade. The control device is configured to acquire a target noise level, for example in the environment of the wind turbine, and the control device is configured to control the at least one add-on member of the blade such that an actual noise level caused by the operation of the wind turbine is equal to or below the target noise level. The control device is configured to control the at least one add-on member such that a power generation of the wind turbine is maximum, while the actual noise level caused by the operation of the wind turbine is maintained equal to or below the target noise level.

In an embodiment, the wind turbine, in particular the blade, comprises a plurality of the add-on members, and the control device is configured to control the plurality of add-on members by limiting a maximum number of add-on members of the plurality of add-on members, which are allowed to be simultaneously actuated to their active positions.

In an embodiment, the at least one add-on member is configured to be continuously moved between a fully retracted position and a fully extended position, and the control device is configured to control the at least one add-on member by limiting a maximum allowable position between the fully retracted position and the fully extended position.

In an embodiment, the control device is configured to control the at least one add-on member by use of a noise model of the wind turbine or a lookup table, which describe the actual noise level as a function of an activation level of the at least one add-on member and at least one operating parameter of the wind turbine, wherein the at least one operating parameter of the wind turbine comprises at least one of a rotational speed of the hub, a power production of the wind turbine, a pitch angle of the at least one blade, and a wind speed in an environment of the wind turbine.

In an embodiment, the control device is configured to receive the actual noise level from a noise detecting device which can comprise a microphone or a vibration detecting device. The microphone and the vibration detecting device can be mounted to the blade, the hub, a nacelle or a tower of the wind turbine.

In an embodiment, the control device is an external device, for example a remote station, apart from the wind turbine, wherein the control device is configured to send a control signal to the wind turbine for controlling the at least one add-on member.

BRIEF DESCRIPTION

Some of the embodiments will be described in detail, with reference to the following figures, wherein like designations denote like members, wherein.

DETAILED DESCRIPTION

Figure 1:
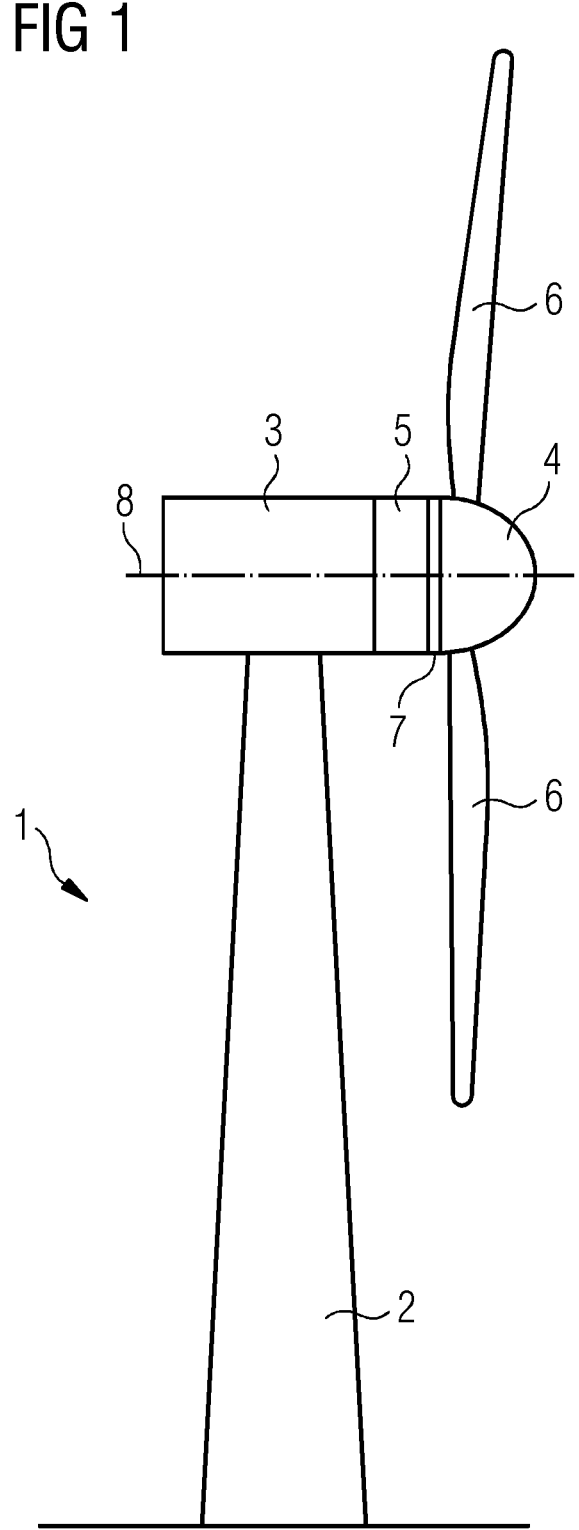
FIG. 1 shows a wind turbine and the different elements thereof.

The illustrations in the drawings are schematically. It is noted that in different figures, similar or identical elements are provided with the same reference signs.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by means of a yaw bearing. The axis of rotation of the nacelle 3 with regard to the tower 2 is referred to as the yaw axis.

The wind turbine 1 also comprises a hub 4 with three rotor blades 6 (of which two rotor blades 6 are depicted in FIG. 1). The hub 4 is mounted rotatable with regard to the nacelle 3 by means of a main bearing 7. The hub 4 is mounted rotatable about a rotor axis of rotation 8.

The wind turbine 1 furthermore comprises a generator 5. The generator 5 in turn comprises a rotor 10 connecting the generator 5 with the hub 4. The hub 4 is connected directly to the generator 5, thus the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the hub 4 into electrical energy in the shape of an AC power.

Figure 2:
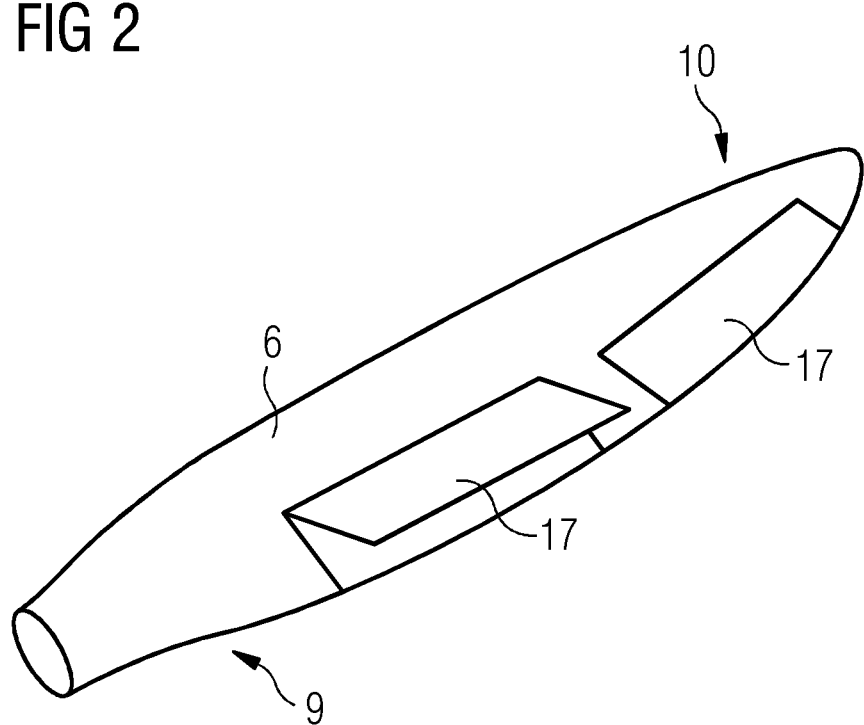
FIG. 2 shows a perspective view of a blade having an add-on member according to an embodiment.

FIG. 2 shows a perspective view of a blade 6 having add-on members 17 according to an embodiment. Reference sign 9 designates an inboard portion of the blade 6, and reference sign 10 designates an outboard portion of the blade 6. The blade 6 comprises at least one add-on member 17, for example two add-on members 17. The add-on members 17 can be placed at any part along a longitudinal direction of the blade 6. In this embodiment, two add-on members 17 are formed as hinged flaps provided at a trailing edge of the blade 6. Strictly speaking, one add-on member 17 is provided at the inboard portion 9, and another add-on member 17 is provided at the outboard portion 10. In FIG. 2, the outboard add-on member 17 is in a retracted position and thus deactivated, while the inboard add-on member 17 is in an extended position and thus activated. However, the add-on member 17 could also be moved to any intermediate position between the fully extended position and the fully retracted position. Any movement of the add-on members 17 can be carried out by one or more trim actuators (not shown). When the add-on member 17 is activated, it changes or modifies an aerodynamic surface or shape of the blade 6, thereby altering lift and/or drag coefficients of the blade 6 during operation. In general, an aerodynamic shape of the blade 6 can be modified by altering a position of the add-on members 17.

Figure 3:
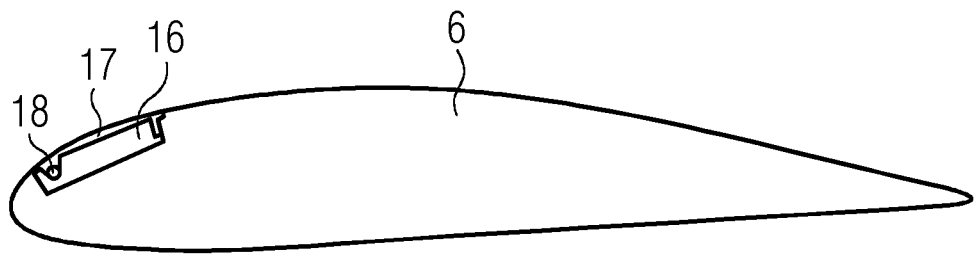
FIG. 3 shows a cross-sectional view of a blade having an add-on member according to an embodiment.
Figure 4:
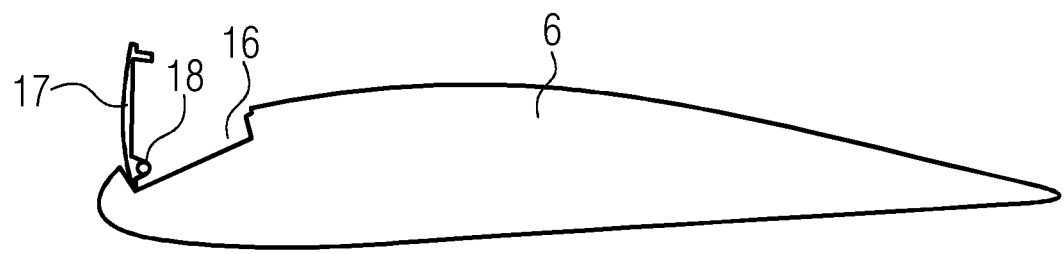
FIG. 4 shows a cross-sectional view of the blade of FIG. 3.

FIGS. 3 and 4 show cross-sectional views of a blade 6 having an add-on member 17 according to an embodiment. The add-on member 17 is designed as a spoiler. The add-on member 17 is here arranged near the leading edge of the blade 6 but can also be arranged near the trailing edge of the blade 6. The add-on member 17 is accommodated in a recess 16 in the blade 6 and can turn about a hinge 18, for example by activation of a trim actuator (not shown). In FIG. 3, the add-on member 17 is shown in a fully retracted position, where the add-on member 17 is deactivated and no spoiler effect and no stall are desired. In FIG. 4, the add-on member 17 is in a fully extended position and thus activated. Strictly speaking, the add-on member 17 is turned to a maximum position, for example by the trim actuator, so that the stalling effect is maximum. However, the add-on member 17 could also be moved to any intermediate position between the fully extended position and the fully retracted position. Any movement of the add-on members 17 can be carried out by the trim actuator.

According to embodiments of the present invention, the add-on member 17 is not necessarily to be formed as a spoiler. The add-on member 17 can have any other configuration which is able to alter the aerodynamic properties of the blade 6.

A plurality of the add-on members 17 of the embodiments in FIGS. 2, 3 and 4 can be provided in an array on the same blade 6 so that the add-on members 17 can be referred to as segmented add-on members 17 which can be actuated independently from each other. The stalling effect at the blade 6 can be controlled by modifying the number of add-on members 17 which is moved to the extended position. It is possible to stop the add-on members 17 at only two end positions, namely at their fully retracted and extended positions. Alternatively, the stall effect can be fine-tuned by stopping the add-on members 17 at any intermediate position between the fully retracted and extended positions. This is particularly useful for add-on members 17 which are arranged at the trailing edge of the blade 6, i.e. so-called trailing flaps.

Figure 5:
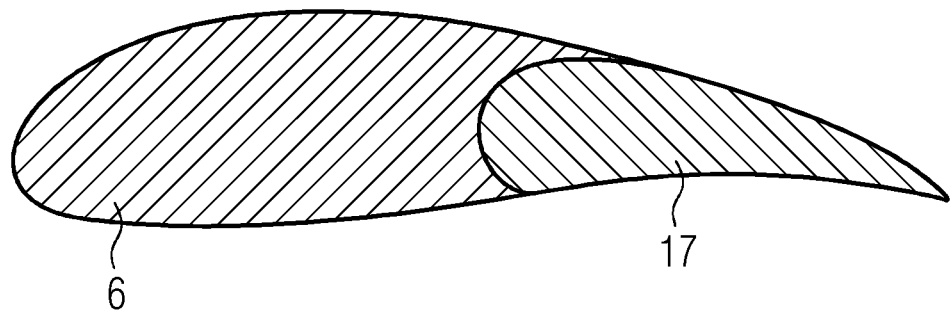
FIG. 5 shows a cross-sectional view of a blade having an add-on member according to an embodiment.
Figure 6:
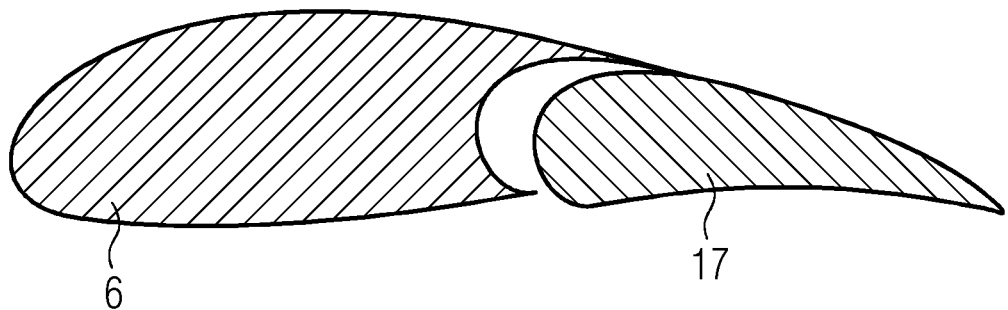
FIG. 6 shows a cross-sectional view of the blade of FIG. 5.

FIGS. 5 and 6 show cross-sectional views of a blade 6 having an add-on member 17 according to an embodiment. As described before, the add-on members 17 of FIGS. 2, 3 and 4 use hinges by which the add-on members 17 are rotatably moved between the active and inactive positions. However, the blades 6 usually comprise quite long and flexible structures which can be deformed during normal operation. The deformation may cause clearances at the hinged add-on members 17 so that noise might occur. The embodiment of FIGS. 5 and 6 therefore uses an add-on member 17 at the trailing edge of the blade 6 which causes a continuous skin deflection of the blade 6. In detail, the add-on member 17 is formed as a shiftable or translatable extension of the trailing edge of the blade 6. The add-on member 17 in FIG. 5 is in a retracted position and thus deactivated, while the add-on member 17 in FIG. 6 is in an extended position and thus activated. However, the add-on member 17 could also be moved to any intermediate position between the fully extended position and the fully retracted position. Any movement of the add-on members 17 can be carried out by a trim actuator (not shown).

Figure 7:
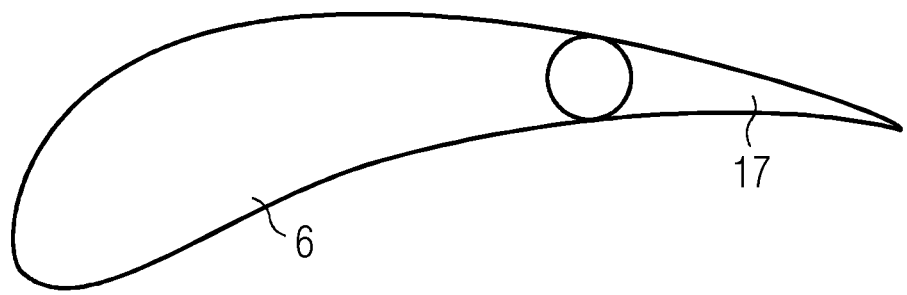
FIG. 7 shows a cross-sectional view of a blade having an add-on member according to an embodiment.
Figure 8:
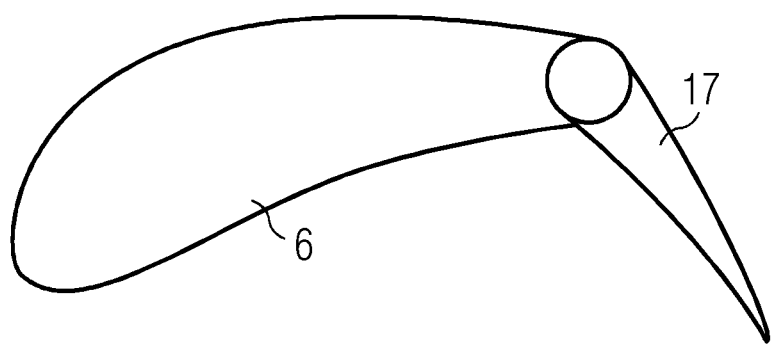
FIG. 8 shows a cross-sectional view of the blade of FIG. 7.

FIGS. 7 and 8 show cross-sectional views of a blade 6 having an add-on member 17 according to an embodiment. Like the embodiment of FIGS. 5 and 6, the add-on member 17 in the embodiment of FIGS. 7 and 8 is arranged at the trailing edge of the blade 6 and causes a continuous skin deflection of the blade 6. In detail, the add-on member 17 is formed as a plain flap which rotates up and downwards on a hinge mounted at the front of the flap. The add-on member 17 in FIG. 7 is in a retracted position and thus deactivated, while the add-on member 17 in FIG. 8 is in an extended position and thus activated. However, the add-on member 17 could also be moved to any intermediate position between the fully extended position and the fully retracted position. Any movement of the add-on members 17 can be carried out by a trim actuator (not shown).

While the add-on members 17 of the embodiments in FIGS. 2, 3 and 4 are referred to as segmented add-on members 17, the add-on members 17 in the embodiment of FIGS. 5 to 8 are not segmented and are usually continuously be actuated between its retracted and extended positions.

All add-on members 17 can be modified compared to the described embodiments. Any add-on member 17 is appropriate for embodiments of the present invention as long as it can actively be moved, rotated, shifted or translated within a cross-section of the blade 6.

The add-on members 17 can be actuated by an actuator so that these add-on members 17 are referred as active add-on members 17. Contrary to this, the add-on members 17 can be actuated by the wind, by inertia forces and/or by centripetal forces so that these add-on members 17 are referred as passive add-on members 17. Both active and passive add-on members 17 are appropriate to realize embodiments of the present invention.

In embodiments of the present invention, any add-on member 17 can be arranged at different locations at the blade 6, for example either at the inboard portion 9 of the blade 6 or at the outboard portion 10 of the blade 6. In an embodiment, a single blade 6 can comprise at least one first add-on member 17 and at least one second add-on member 17, wherein the at least one first add-on member 17 is closer to the inboard portion 9 of the blade 6 than the at least one second add-on member 17. Consequently, the at least one second add-on member 17 is closer to the outboard portion 10 of the blade 6 than the at least one first add-on member 17. Usually, the second add-on member 17 generates more noise than the first add-on member 17 so that the first and second add-on members 17 can differently be controlled so as to achieve different noise reduction levels.

In an embodiment, a method of controlling the wind turbine 1 comprises a step of acquiring a target noise level, for example in the environment of the wind turbine 1, and a step of controlling the at least one add-on member 17 of the blade 2 such that an actual noise level caused by the operation of the wind turbine 1 is equal to or below the target noise level. The at least one add-on member 17 is controlled such that a power generation of the wind turbine 1 is maximum, while the actual noise level caused by the operation of the wind turbine 1 is maintained equal to or below the target noise level.

If the wind turbine 1, in particular the blade 6, comprises a plurality of the add-on members 17, for example segmented add-on members 17, the plurality of add-on members 17 can be controlled by limiting a maximum number of add-on members 17 of the plurality of add-on members 17, which are allowed to be simultaneously actuated to their active positions.

If the at least one add-on member 17 is configured to be continuously moved between a fully retracted position and a fully extended position, the at least one add-on member 17 can be controlled by limiting a maximum allowable position between the fully retracted position and the fully extended position.

In an embodiment, a noise model of the wind turbine 1 or a lookup table can be created, which describe the actual noise level as a function of an activation level of the at least one add-on member 17 and of at least one operating parameter of the wind turbine 1. The controlling of the at least one add-on member 17 of the blade 2 is carried out by use of the noise model or the lookup table. The at least one operating parameter of the wind turbine 1 can comprises at least one of a rotational speed of the hub 4, a power production of the wind turbine 1, a pitch angle of the at least one blade 6, and a wind speed in the environment of the wind turbine 1.

The noise model or the lookup table can further describe the actual noise level as a function of a position of the at least one add-on member 17 at the blade 6. For example, the at least one blade 6 can comprises the at least one first add-on member 17 and the at least one second add-on member 17, wherein the at least one first add-on member 17 is closer to the inboard portion 9 of the blade 6 than the at least one second add-on member 17. Usually, the second add-on member 17 generates more noise than the first add-on member 17. Thus, the first add-on member 17 can be controlled in a different manner compared with the second add-on member 17, in particular the first add-on member 17 can be controlled to achieve a first noise reduction level, and the second add-on member 17 can be controlled to achieve a second noise reduction level. The noise reduction level means an amount by which the noise is reduced. As the second add-on member 17 usually generates more noise than the first add-on member 17 due to the position of the second add-on member 17 at the outboard portion 10, the first noise reduction level can be lower than the second noise reduction level.

In an embodiment, the actual noise level can be measured by a noise detecting device. The noise detecting device can comprise at least one of a microphone and a vibration detector.

In an embodiment, the method is carried out by an external device apart from the wind turbine 1, wherein the external device is configured to send a control signal to the wind turbine 1 for controlling the at least one add-on member 17.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine, the wind turbine comprising a hub having at least one blade comprising at least one first add-on member and at least one second add-on member, wherein the at least one first add-on member is closer to an inboard portion of the blade than the at least one second add-on member, the at least one first add-on member and the at least one second add-on member being actuated to alter aerodynamic properties of the blade, the method comprising:
   acquiring a target noise level; and
   controlling the at least one add-on member of the blade such that an actual noise level caused by the operation of the wind turbine is equal to or below the target noise level;
   wherein the first add-on member is controlled in a different manner compared with the second add-on member, the first add-on member being controlled to achieve a first noise reduction level and the second add-on member is controlled to achieve a second noise reduction level, further wherein first noise reduction level is lower than the second noise reduction level.

2. The method according to claim 1, wherein
   the at least one add-on member is controlled such that a power generation of the wind turbine is maximum, while the actual noise level caused by the operation of the wind turbine is maintained equal to or below the target noise level.

3. The method according to claim 1, wherein:
   the blade comprises a plurality of the add-on members; and
   the plurality of add-on members is controlled by limiting a maximum number of add-on members of the plurality of add-on members, which are allowed to be simultaneously actuated to active positions.

4. The method according to claim 1, wherein:
   the at least one add-on member is configured to be continuously moved between a fully retracted position and a fully extended position; and
   the at least one add-on member is controlled by limiting a maximum allowable position between the fully retracted position and the fully extended position.

5. The method according to claim 1, further comprising:
   creating a noise model of the wind turbine or a lookup table, which describe the actual noise level as a function of an activation level of the at least one add-on member and of at least one operating parameter of the wind turbine, wherein the controlling of the at least one add-on member of the blade is carried out by use of the noise model or the lookup table.

6. The method according to claim 5, wherein
   the at least one operating parameter of the wind turbine comprises at least one of a rotational speed of the hub, a power production of the wind turbine, a pitch angle of the at least one blade, and a wind speed in an environment of the wind turbine.

7. The method according to claim 5, wherein the noise model or the lookup table describe the actual noise level further as a function of a position of the at least one add-on member at the blade.

8. The method according to claim 1, wherein the actual noise level is measured by a noise detecting device.

9. A control device for controlling a wind turbine, the wind turbine comprising a hub having at least one blade with at least one an add-on member which is actuated to alter aerodynamic properties of the blade, wherein
   the control device is configured to acquire a target noise level; and
   the control device is configured to control the at least one add-on member of the blade such that an actual noise level caused by the operation of the wind turbine is equal to or below the target noise level; wherein
   the control device is configured to control the at least one add-on member such that a power generation of the wind turbine is maximum, while the actual noise level caused by the operation of the wind turbine is maintained equal to or below the target noise level.

10. The control device according to claim 9, wherein:

the blade comprises a plurality of the add-on members; and the control device is configured to control the plurality of add-on members by limiting a maximum number of add-on members of the plurality of add-on members, which are allowed to be simultaneously actuated to their active positions.

11. The control device according to claim 9, wherein:

the at least one add-on member is configured to be continuously moved between a fully retracted position and a fully extended position; and the control device is configured to control the at least one add-on member by limiting a maximum allowable position between the fully retracted position and the fully extended position.

12. The control device according to claim 9, wherein:

the control device is configured to control the at least one add-on member by use of a noise model of the wind turbine or a lookup table, which describe the actual noise level as a function of an activation level of the at least one add-on member and at least one operating parameter of the wind turbine, wherein the at least one operating parameter of the wind turbine comprises at least one of a rotational speed of the hub, a power production of the wind turbine, a pitch angle of the at least one blade, and a wind speed in an environment of the wind turbine.

13. The control device according to claim 9, wherein the control device is configured to receive the actual noise level from a noise detecting device.

14. The control device according to claim 9, wherein the control device is an external device apart from the wind turbine, wherein the control device is configured to send a control signal to the wind turbine for controlling the at least one add-on member.

\* \* \* \* \*